United States Patent
Katsumata

(10) Patent No.: US 9,923,419 B2
(45) Date of Patent: Mar. 20, 2018

(54) ELECTRIC POWER TRANSMITTER, ELECTRIC POWER TRANSMISSION METHOD AND SEMICONDUCTOR DEVICE

(71) Applicant: Kabushiki Kaisha Toshiba, Minato-ku, Tokyo (JP)

(72) Inventor: Tomoki Katsumata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 184 days.

(21) Appl. No.: 15/065,598

(22) Filed: Mar. 9, 2016

(65) Prior Publication Data
US 2017/0040847 A1 Feb. 9, 2017

Related U.S. Application Data

(60) Provisional application No. 62/201,451, filed on Aug. 5, 2015.

(51) Int. Cl.
| | | |
|---|---|---|
| H01F 27/42 | (2006.01) | |
| H01F 37/00 | (2006.01) | |
| H01F 38/00 | (2006.01) | |
| H02J 50/60 | (2016.01) | |
| H02J 7/02 | (2016.01) | |

(52) U.S. Cl.
CPC .............. *H02J 50/60* (2016.02); *H02J 7/025* (2013.01)

(58) Field of Classification Search
CPC . H02J 5/005; H02J 7/025; H02J 17/00; H01F 38/14; B60L 11/182
USPC ........................................................ 307/104
See application file for complete search history.

(56) References Cited

U.S. PATENT DOCUMENTS

| | | | | |
|---|---|---|---|---|
| 9,106,079 B2* | 8/2015 | Fukaya | ................ | H02J 7/0004 |
| 2009/0033280 A1* | 2/2009 | Choi | ....................... | H02J 7/025 |
| | | | | 320/108 |
| 2009/0224723 A1* | 9/2009 | Tanabe | .................... | H02J 7/025 |
| | | | | 320/108 |
| 2013/0015705 A1* | 1/2013 | Abe | ....................... | H02J 5/005 |
| | | | | 307/29 |
| 2013/0175877 A1* | 7/2013 | Abe | ..................... | H04B 5/0037 |
| | | | | 307/104 |
| 2013/0241300 A1* | 9/2013 | Miyamoto | .............. | H01F 5/003 |
| | | | | 307/104 |

FOREIGN PATENT DOCUMENTS

| | | | |
|---|---|---|---|
| JP | 5708563 B2 | 4/2015 | |
| JP | 5713874 B2 | 5/2015 | |

\* cited by examiner

*Primary Examiner* — Quan Tra
(74) *Attorney, Agent, or Firm* — White & Case LLP

(57) ABSTRACT

According to an embodiment, an electric power transmitter has a first electric power transmitting unit, a second electric power transmitting unit, a first detecting unit configured to detect a first placed object on the first electric power transmitting unit, a second detecting unit configured to detect a second placed object on the second electric power transmitting unit, a timer unit configured to, when the first placed object on the first electric power transmitting unit is detected, start driving, and a judging unit configured to, when the second placed object on the second electric power transmitting unit is detected within a predetermined time period from driving of the timer unit, judge that the first placed object and the second placed object are one common placed object.

20 Claims, 10 Drawing Sheets

FIG. 12

| Ch1 ELECTRIC POWER TRANSMITTING UNIT | Ch2 ELECTRIC POWER TRANSMITTING UNIT | | | |
|---|---|---|---|---|
| | WITHIN PREDETERMINED TIME PERIOD T | | AFTER PREDETERMINED TIME PERIOD T ELAPSES | |
| COMMUNICATION IS ESTABLISHED | COMMUNICATION IS ESTABLISHED | Ch1 ELECTRIC POWER RECEIVING UNIT / Ch2 ELECTRIC POWER RECEIVING UNIT | COMMUNICATION IS ESTABLISHED | Ch1 ELECTRIC POWER RECEIVING UNIT / Ch2 ELECTRIC POWER RECEIVING UNIT |
| | COMMUNICATION IS NOT ESTABLISHED (A1) | Ch1 ELECTRIC POWER RECEIVING UNIT / Ch2 NOT DISPLAYED | COMMUNICATION IS NOT ESTABLISHED | Ch1 ELECTRIC POWER RECEIVING UNIT / Ch2 FOREIGN MATTER |
| COMMUNICATION IS NOT ESTABLISHED | COMMUNICATION IS ESTABLISHED (A2) | Ch1 NOT DISPLAYED / Ch2 ELECTRIC POWER RECEIVING UNIT | COMMUNICATION IS ESTABLISHED | Ch1 FOREIGN MATTER / Ch2 ELECTRIC POWER RECEIVING UNIT |
| | COMMUNICATION IS NOT ESTABLISHED | Ch1 FOREIGN MATTER / Ch2 NOT DISPLAYED | COMMUNICATION IS NOT ESTABLISHED | Ch1 FOREIGN MATTER / Ch2 FOREIGN MATTER |

ELECTRIC POWER TRANSMITTER, ELECTRIC POWER TRANSMISSION METHOD AND SEMICONDUCTOR DEVICE

CROSS-REFERENCE TO RELATED APPLICATIONS

This application is based upon and claims the benefit of priority from U.S. Provisional Application No. 62/201,451, filed on Aug. 5, 2015, the entire contents of which are incorporated herein by reference.

FIELD

An embodiment described herein relates generally to an electric power transmitter, an electric power transmission method and a semiconductor device.

BACKGROUND

Conventionally, there is a wireless power feeding technique in which an electric power transmitting unit having an electric power transmitting coil transmits electric power to an electric power receiving unit having an electric power receiving coil in a contactless manner to charge an electric power receiving target.

Among electric power transmitters used in wireless power feeding, there is an electric power transmitter which has a plurality of electric power transmitting units so that electric power can be transmitted to a plurality of electric power receiving targets at the same time.

Further, in the electric power transmitter used in wireless power feeding, a foreign matter on an electric power transmitting unit is detected based on an electric parameter of a circuit so as to prevent electric power from being transmitted in a state where a foreign matter such as a metal is put between an electric power transmitting unit and an electric power receiving unit.

However, when, in the conventional electric power transmitter having a plurality of electric power transmitting units, the electric power transmitter is provided so that one electric power receiving target is placed across the plurality of electric power transmitting units, an electric power transmitting unit located below an electric power receiving unit detects the electric power receiving unit. However, when part of the electric power receiving target is placed above the electric power transmitting units, other electric power transmitting units do not detect the electric power receiving unit, thus detect the electric power receiving target as a foreign matter.

When the electric power transmitter detects a foreign matter, the electric power transmitter issues an alarm to a user through LED lighting, or the like, which results in wasting power consumption of the electric power transmitter due to LED lighting, or the like, and which requires an extra work for a user to halt power feeding and place the electric power receiving target again.

BRIEF DESCRIPTION OF THE DRAWINGS

FIG. 12 is a table for explaining display content of display units of the electric power transmitter according to the embodiment.

DETAILED DESCRIPTION

Embodiment

An embodiment will be described below with reference to the drawings.

(Configuration)

Figure 1:
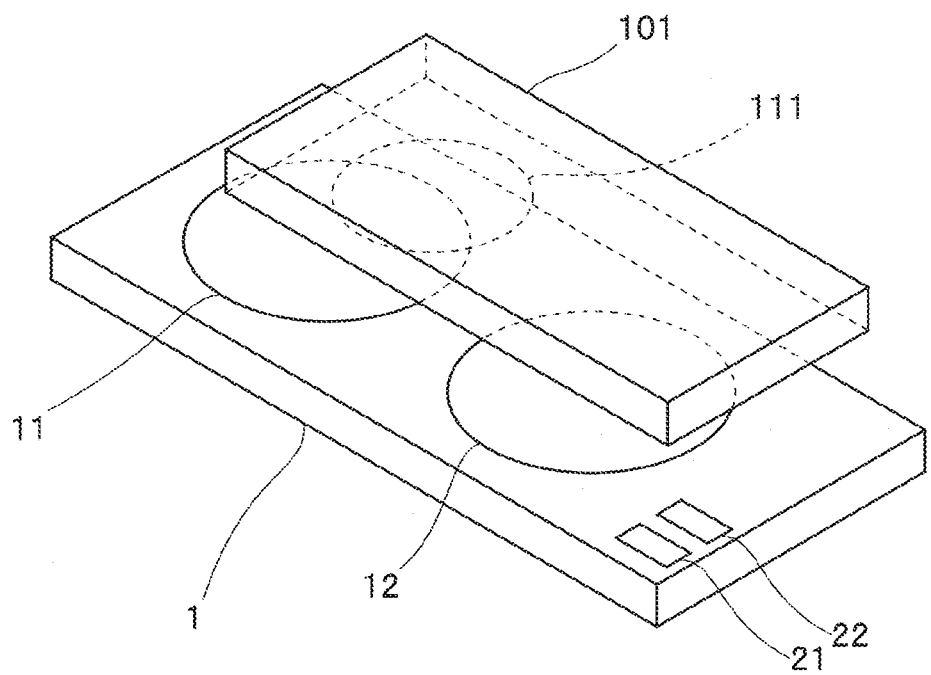
FIG. 1 is an external configuration diagram of an electric power transmitter and an electric power receiving target according to an embodiment.
Figure 2:
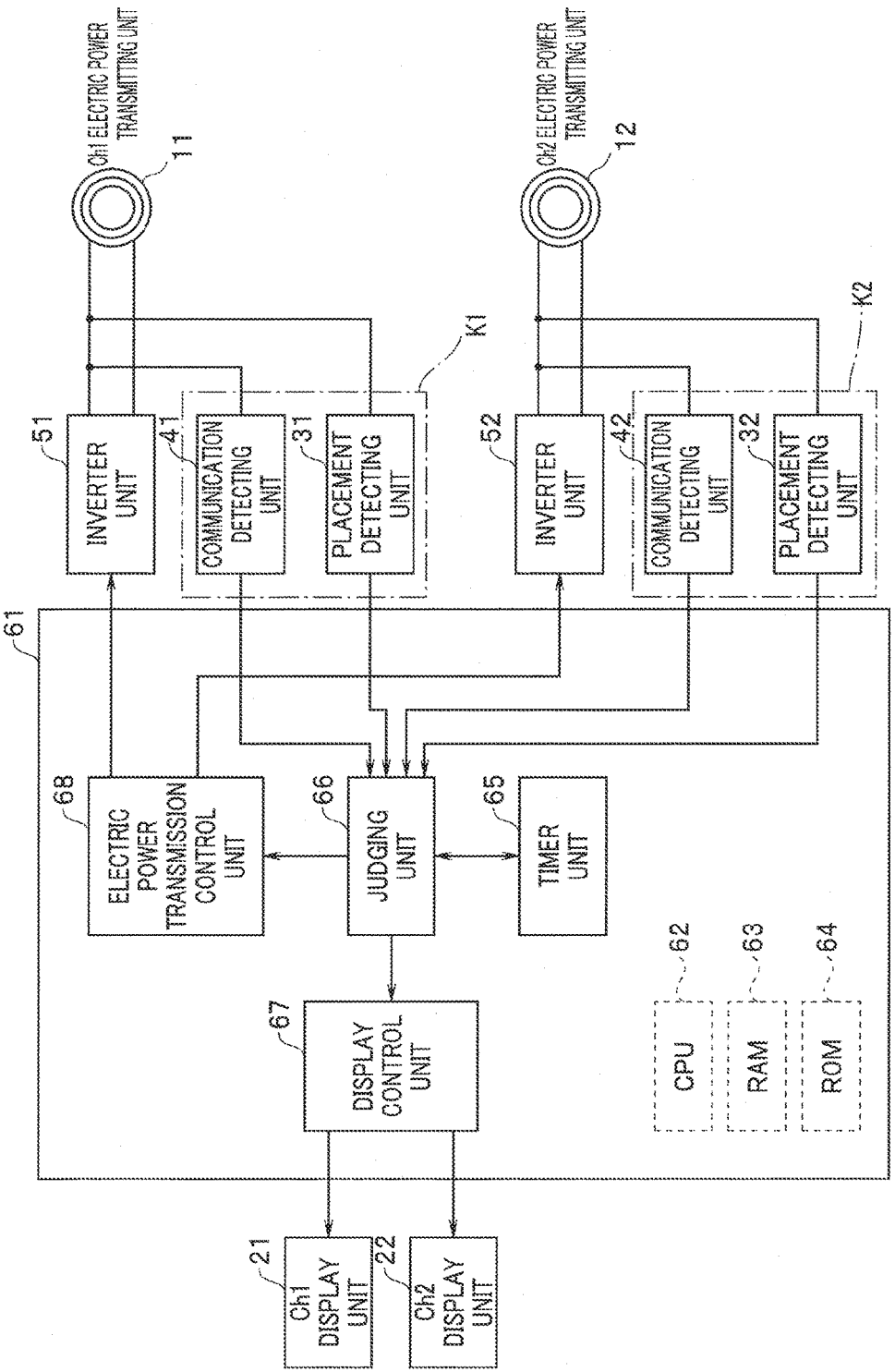
FIG. 2 is a block diagram illustrating a configuration of main components of the electric power transmitter according to the embodiment.
Figure 3:
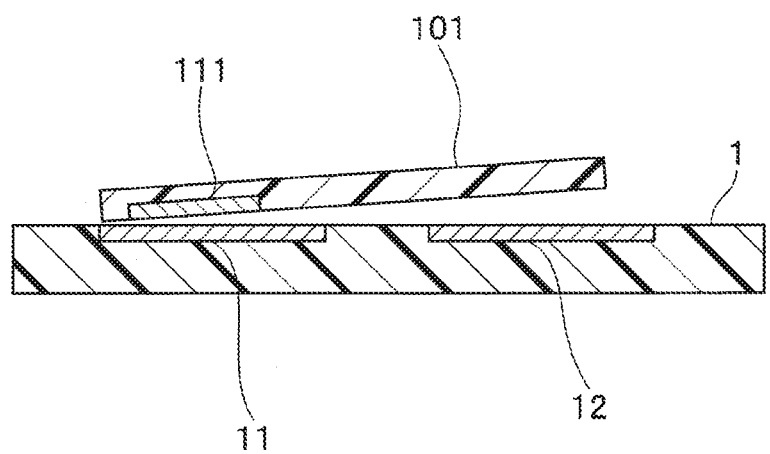
FIG. 3 is a cross-section diagram of the electric power transmitter and the electric power receiving target according to the embodiment.
Figure 4:
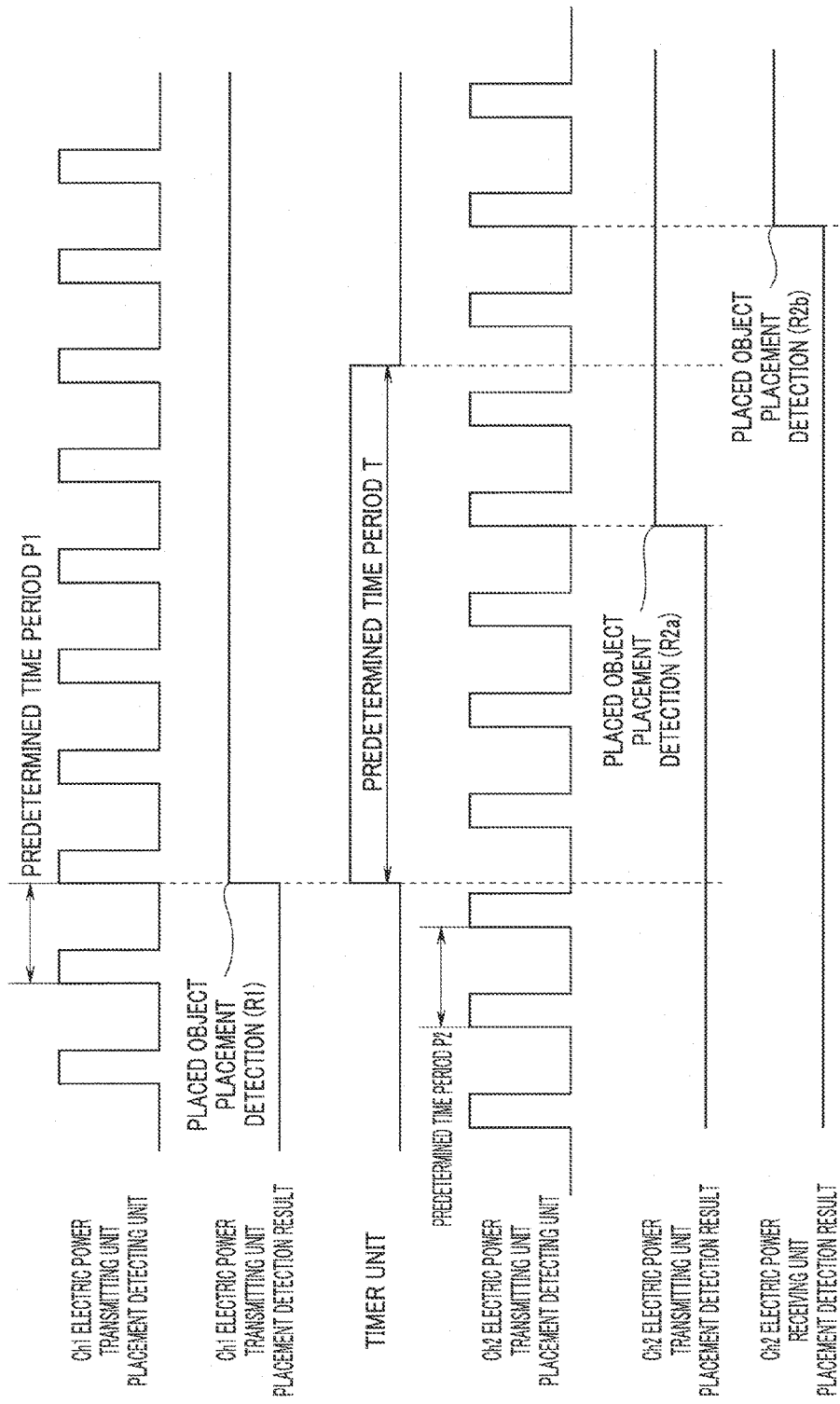
FIG. 4 is a time chart of processing of the electric power transmitter according to the embodiment.

FIG. 1 is an external configuration diagram of an electric power transmitter 1 and an electric power receiving target 101 according to the embodiment. FIG. 2 is a block diagram illustrating a configuration of main components of the electric power transmitter 1 according to the embodiment. FIG. 3 is a cross-section diagram of the electric power transmitter 1 and the electric power receiving target 101 according to the embodiment. FIG. 4 is a time chart of processing of the electric power transmitter 1 according to the embodiment.

As illustrated in FIG. 1, the electric power transmitter 1 includes a Ch1 electric power transmitting unit 11 having an electric power transmitting coil, a Ch2 electric power transmitting unit 12 having an electric power transmitting coil, a Ch1 display unit 21 and a Ch2 display unit 22.

The electric power receiving target 101 includes an electric power receiving unit 111 having an electric power receiving coil. The electric power receiving target 101 is placed on the electric power transmitter 1 so that the electric power receiving unit 111 is located on the Ch1 electric power transmitting unit 11.

Next, main components of the electric power transmitter 1 will be described using FIG. 2. Note that, in FIG. 2, a configuration other than the main components of the electric power transmitter 1 is omitted.

The main components of the electric power transmitter 1 include the Ch1 electric power transmitting unit 11 having a first electric power transmitting coil, the Ch2 electric power transmitting unit 12 having a second electric power transmitting coil, two placement detecting units 31 and 32, two communication detecting units 41 and 42, two inverter units 51 and 52, a control unit 61, the Ch1 display unit 21 and the Ch2 display unit 22.

First, the Ch1 electric power transmitting unit 11 side will be described.

The Ch1 electric power transmitting unit 11 has an electric power transmitting coil for electric power transmission. The Ch1 electric power transmitting unit 11 is electrically connected to the inverter unit 51 which will be described later, and AC power is supplied to the Ch1 electric power transmitting unit 11 from the inverter unit 51. When the AC power is supplied from the inverter unit 51, the Ch1 electric power transmitting unit 11 can generate an AC magnetic field and transmit electric power to the electric power receiving unit 111 of the electric power receiving target 101 placed on the Ch1 electric power transmitting unit 11 in a noncontact manner.

The placement detecting unit 31 is a circuit configured to detect that an object to be placed is placed on the Ch1 electric power transmitting unit 11. The placement detecting unit 31 is electrically connected between the Ch1 electric power transmitting unit 11 and the control unit 61. The placement detecting unit 31 is configured to send out a slight current for communication detection for each predetermined time period P1 so as to be able to monitor a current value of the Ch1 electric power transmitting unit 11, and can detect that an object to be placed is placed on the Ch1 electric power transmitting unit 11 by determining whether or not change of the current value of the Ch1 electric power transmitting unit 11 exceeds a predetermined threshold.

Here, the predetermined time period P1 is a time period during which it is possible to immediately detect that an object to be placed is placed. The predetermined time period P1 is, for example, a time period in a range from 0.01 seconds to 0.3 seconds.

When an object to be placed such as a metal is placed on the Ch1 electric power transmitting unit 11, a value of a current flowing through the electric power transmitting coil of the Ch1 electric power transmitting unit 11 changes by change of the magnetic field. When the current value of the electric power transmitting unit exceeds the predetermined threshold, the placement detecting unit 31 detects that an object to be placed is placed, and transmits a placement signal indicating that the object to be placed is placed to the control unit 61.

The communication detecting unit 41 is a circuit configured to detect a response signal (ACK) received from the electric power receiving target 101 via the Ch1 electric power transmitting unit 11. The communication detecting unit 41 is electrically connected between the Ch1 electric power transmitting unit 11 and the control unit 61.

When the electric power receiving target 101 is placed on the Ch1 electric power transmitting unit 11, the electric power receiving target 101 transmits the response signal (ACK) to the Ch1 electric power transmitting unit 11 via an AC magnetic field.

The response signal (ACK) transmitted from the electric power receiving target 101 is superimposed on the AC power flowing through the Ch1 electric power transmitting unit 11 via the Ch1 electric power transmitting unit 11. The communication detecting unit 41 filters the AC power, detects the response signal (ACK) received from a receiving unit of the electric power receiving target 101, and transmits the detected response signal (ACK) to the control unit 61.

The placement detecting unit 31 and the communication detecting unit 41 configure a first detecting unit K1 configured to detect an object to be placed on the Ch1 electric power transmitting unit 11.

The inverter unit 51 is a circuit which can convert DC power into AC power. The inverter unit 51 is connected to the control unit 61, the Ch1 electric power transmitting unit 11, and a DC power supply which is not illustrated. When the inverter unit 51 receives a control signal giving an instruction of electric power transmission from the control unit 61 through processing of an electric power transmission control unit 68 which will be described later, the inverter unit 51 converts DC power inputted from the DC power supply into AC power and supplies the AC power to the Ch1 electric power transmitting unit 11.

Subsequently, the Ch2 electric power transmitting unit 12 will be described. Because functions of the Ch2 electric power transmitting unit 12 are the same as those of the Ch1 electric power transmitting unit 11, description of functions overlapping with those of the Ch1 electric power transmitting unit 11 will be omitted, and only connection relationship will be described.

The Ch2 electric power transmitting unit 12 is connected to the inverter unit 52 which will be described later.

The placement detecting unit 32 is connected between the Ch2 electric power transmitting unit 12 and the control unit 61.

The communication detecting unit 42 is connected between the Ch2 electric power transmitting unit 12 and the control unit 61.

The placement detecting unit 32 and the communication detecting unit 42 configure a second detecting unit K2 which detects an object to be placed on the Ch2 electric power transmitting unit 12.

The inverter unit 52 is connected between the Ch2 electric power transmitting unit 12 and the control unit 61.

As indicated with a dashed line in FIG. 2, the control unit 61 includes a central processing unit (hereinafter, referred to as a "CPU") 62, a RAM 63 and a ROM 64. The CPU 62 can execute various kinds of programs relating to electric power transmission. In the ROM 64, programs used in a timer unit 65, a judging unit 66, a display control unit 67 and an electric power transmission control unit 68 in addition to the various kinds of programs, are stored. Functions of respective processing units are implemented by the CPU 62 executing the programs.

The timer unit 65 is a processing unit configured to start driving by a drive instruction inputted from the judging unit 66 and stop driving after a predetermined time period T has elapsed.

The judging unit 66 judges whether or not an object to be placed is placed on each electric power transmitting unit, and, whether or not the placed object is the electric power receiving unit of the electric power receiving target 101 using signals transmitted from the placement detecting units 31 and 32 and the communication detecting units 41 and 42. For example, when the first detecting unit K1 and the second detecting unit K2 detect placed objects within a predetermined time period T, and one of the detecting units detects the electric power receiving unit of the electric power receiving target 101, and the other does not detect the electric power receiving unit, the judging unit 66 judges that one common electric power receiving target 101 is placed on the Ch1 electric power transmitting unit 11 which is a first electric power transmitting unit and the Ch2 electric power transmitting unit 12 which is a second electric power transmitting unit.

As illustrated in FIG. 3, when the electric power receiving target 101 is placed on the electric power transmitter 1, it is assumed that a portion having the electric power receiving unit 111 and a portion not having the electric power receiving unit 111 of the electric power receiving target 101 are integrally placed on the electric power transmitter, and the respective portions are placed on the Ch1 electric power transmitting unit 11 and the Ch2 electric power transmitting unit 12 with a very small time difference.

When one electric power receiving target 101 is placed across the two electric power transmitting units at the same time, while a time difference between the two detecting units K1 and K2 is zero, actually, some time difference occurs. That is, as illustrated in FIG. 3, the time difference occurs because an end portion of the electric power receiving unit 111 side of the electric power receiving target 101 is first placed on the electric power transmitter 1, and an end portion on the opposite side of the electric power receiving unit 111 is placed subsequently. While this time difference varies depending on a size, weight, or the like, of the electric power receiving target 101, the predetermined time period T is set so as to be longer than a time difference between detection by the first detecting unit K1 and detection by the second detecting unit K2, assumed when one electric power receiving target 101 is placed across the two electric power transmitting units. Further, the predetermined time period T is set in advance so as to be shorter than a minimum time difference between detection by the first detecting unit K1 and detection by the second detecting unit K2, assumed when two different electric power receiving targets are respectively placed on the Ch1 electric power transmitting unit 11 and the Ch2 electric power transmitting unit 12. The predetermined time period T is, for example, a time period in a range from 0.1 seconds to 1 second.

FIG. 4 is a time chart of processing of the electric power transmitter 1 according to the embodiment. The placement detecting unit 31 detects whether or not an object to be placed is placed on the Ch1 electric power transmitting unit 11 for each predetermined time period P1. When the placement detecting unit 31 detects an object to be placed, the timer unit 65 starts driving only for the predetermined time period T (R1 in FIG. 4).

The placement detecting unit 32 detects whether or not an object to be placed is placed on the Ch2 electric power transmitting unit in every predetermined time period P2. When the placement detecting unit 32 detects an object placed on the Ch2 electric power transmitting unit 12 within the predetermined time period T (R2a in FIG. 4), it is judged that the object placed on the Ch1 electric power transmitting unit 11 and the object placed on the Ch2 electric power transmitting unit 12 are one common placed object. On the other hand, when the placement detecting unit 32 detects an object placed on the Ch2 electric power transmitting unit 12 after the predetermined time period T has elapsed (R2b in FIG. 4), it is judged that the object placed on the Ch1 electric power transmitting unit 11 and the object placed on the Ch2 electric power transmitting unit 12 are different objects. Note that cycles of the predetermined time period P1 and the predetermined time period P2 do not have to be the same between the Ch1 electric power transmitting unit 11 and the Ch2 electric power transmitting unit 12.

The display control unit 67 is a processing unit configured to control display of the Ch1 display unit 21 and the Ch2 display unit 22 which will be described later using a judgement result outputted from the judging unit 66. The display control unit 67, for example, controls each of the Ch1 display unit 21 and the Ch2 display unit 22 so as to emit a light of blue color when it is judged that the placed object is the electric power receiving unit 111 of the electric power receiving target 101, so as not to emit a light when it is judged that the placed object is a portion not having the electric power receiving unit 111 of the electric power receiving target 101, and so as to emit a light of red color when it is judged that the placed object is a foreign matter. Note that display of the Ch1 display unit 21 and the Ch2 display unit 22 is not limited to the above-description, and any display may be provided if the display is provided according to the placed object.

The electric power transmission control unit 68 is a processing unit configured to control electric power transmission of the inverter unit 51 and the inverter unit 52. When the judging unit 66 gives an instruction to transmit electric power to the Ch1 electric power transmitting unit 11, the electric power transmission control unit 68 transmits a control signal to the inverter unit 51 to supply electric power to the Ch1 electric power transmitting unit 11, and, when the judging unit 66 gives an instruction to start electric power transmission to the Ch2 electric power transmitting unit 12, the electric power transmission control unit 68 transmits a control signal to the inverter unit 52 to supply electric power to the Ch2 electric power transmitting unit 12.

Each of the Ch1 display unit 21 and the Ch2 display unit 22 which are display units is configured with, for example, a light emitting device such as an LED which can perform color light emission. Each of the Ch1 display unit 21 and the Ch2 display unit 22 is connected to the control unit 61 and emits a light by a control signal outputted through processing of the display control unit 67. The Ch1 display unit 21 can display a judgement result regarding the Ch1 electric power transmitting unit 11. Note that while the display unit is configured with a light emitting device in the embodiment, the display unit is not limited to the light emitting device if the display unit can display the judgement result.

Note that while in the embodiment, functions of each processing unit of the control unit 61 are implemented by programs being executed, part or all of the functions of each processing unit may be implemented using circuits.

(Operation)

Figure 5:
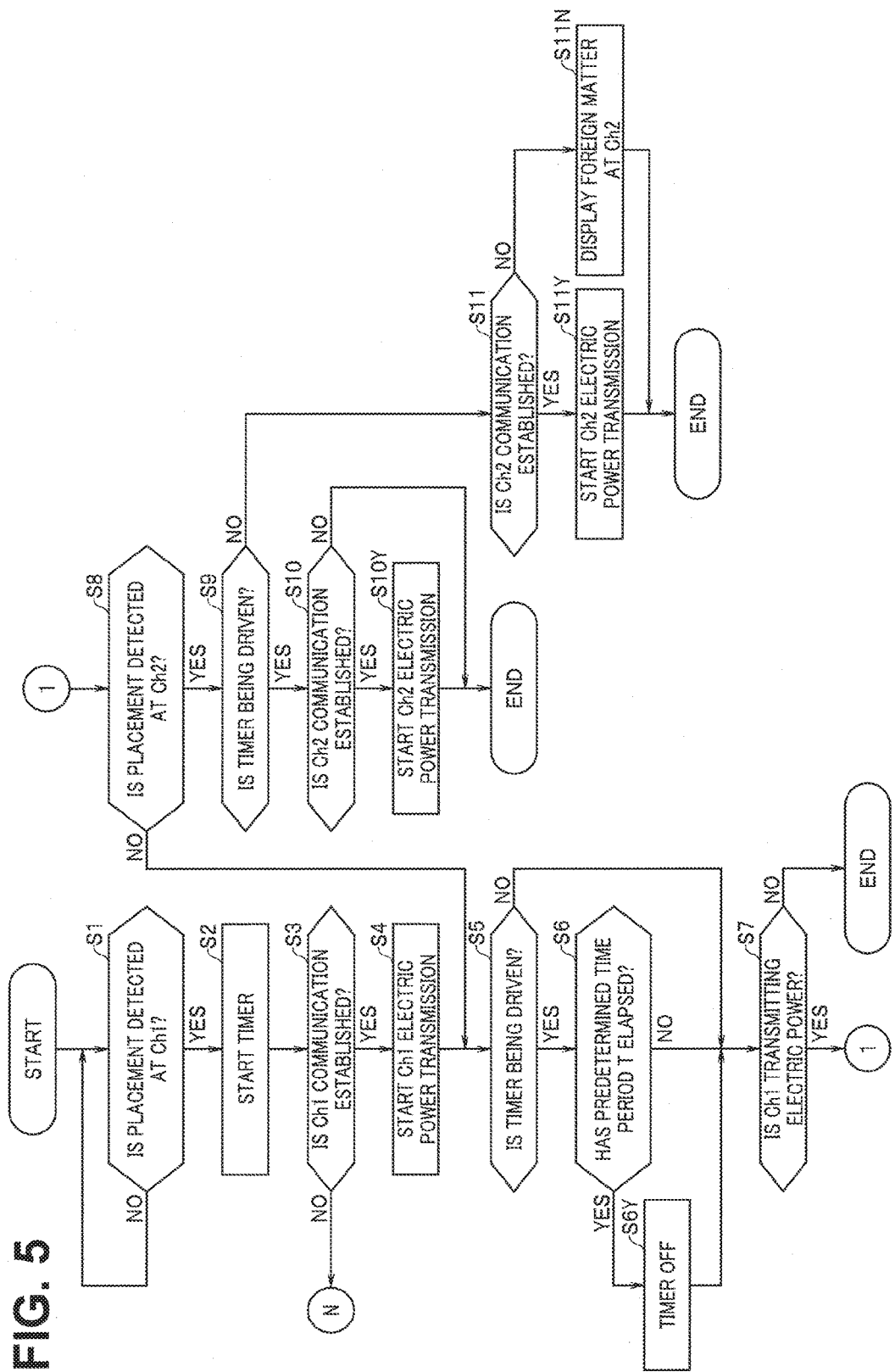
FIG. 5 is a flowchart illustrating flow of the processing of the electric power transmitter according to the embodiment.
Figure 6:
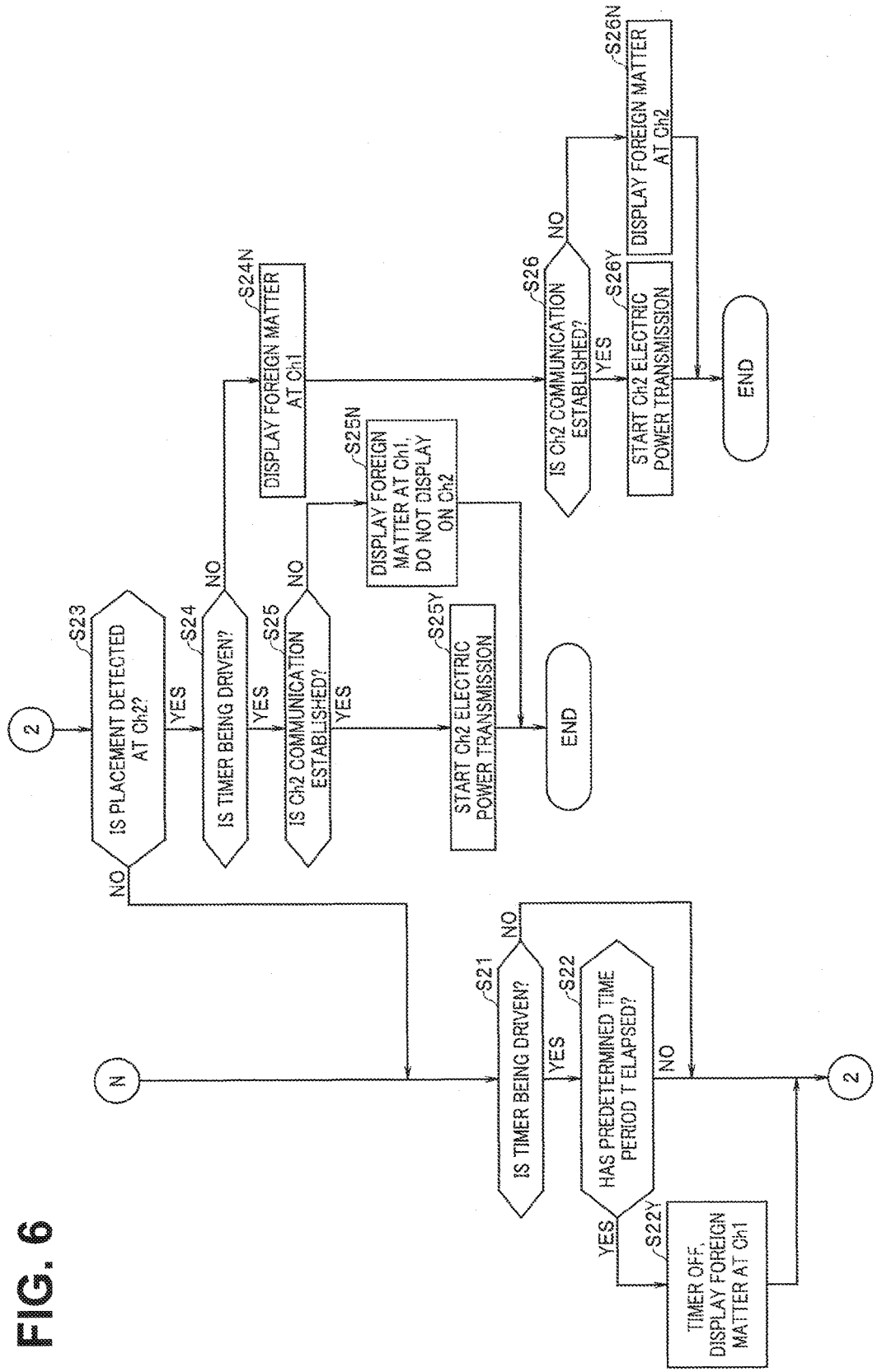
FIG. 6 is a flowchart illustrating flow of the processing of the electric power transmitter according to the embodiment.
Figure 7:
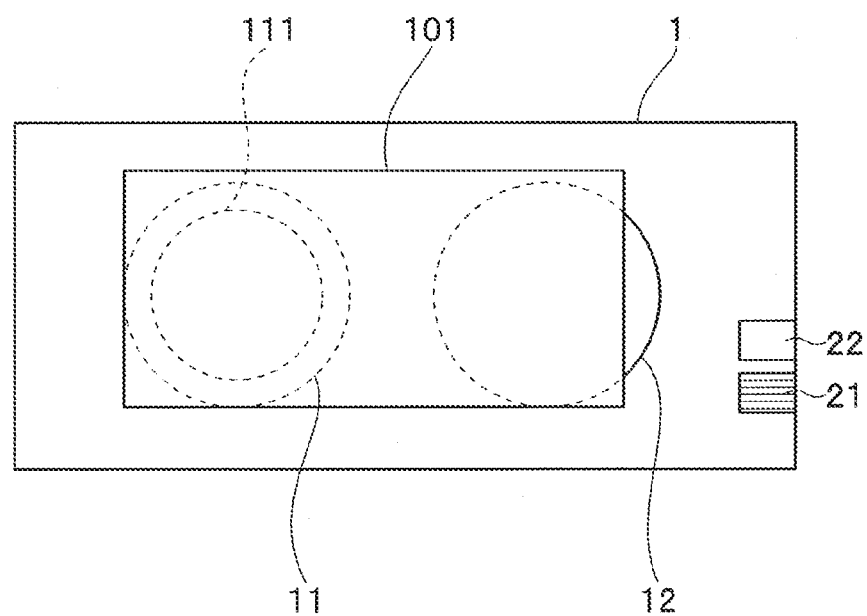
FIG. 7 is an explanatory diagram for explaining a state where the electric power receiving target is placed across two electric power transmitting units of the electric power transmitter according to the embodiment.
Figure 8:
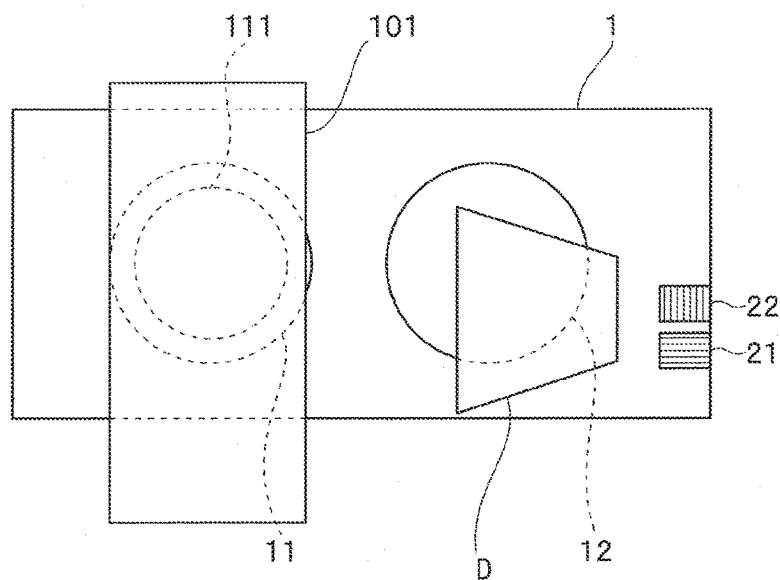
FIG. 8 is an explanatory diagram for explaining a state where the electric power receiving target is placed on one of electric power transmitting units and a foreign matter is placed on the other of the electric power transmitting units in the electric power transmitter according to the embodiment.
Figure 9:
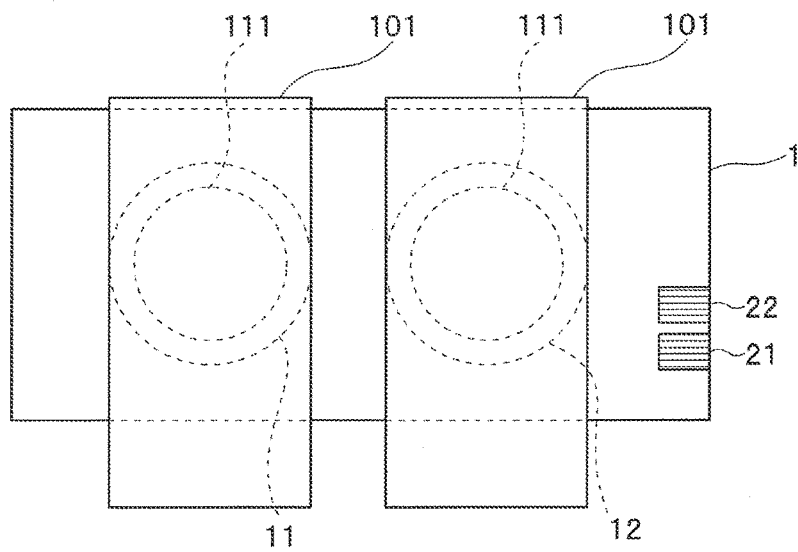
FIG. 9 is an explanatory diagram for explaining a state where electric power receiving targets are respectively placed on the two electric power transmitting units of the electric power transmitter according to the embodiment.

FIG. 5 is a flowchart illustrating flow of processing of the electric power transmitter 1 according to the embodiment. FIG. 6 is a flowchart illustrating flow of the processing of the electric power transmitter 1 according to the embodiment. FIG. 7 is an explanatory diagram for explaining a state where the electric power receiving target 101 is placed across two electric power transmitting units of the electric power transmitter 1 according to the embodiment. FIG. 8 is an explanatory diagram for explaining a state where the electric power receiving target 101 is placed on one of electric power transmitting units and a foreign matter is placed on the other of the electric power transmitting units in the electric power transmitter 1 according to the embodiment. FIG. 9 is an explanatory diagram for explaining a state where the electric power receiving targets 101 are respectively placed on two electric power transmitting units of the electric power transmitter 1 according to the embodiment.

Operation of the electric power transmitter 1 will be described next.

The flow of the processing described next is flow of processing in the case where an object to be placed is first placed on the Ch1 electric power transmitting unit 11. Flow of processing in the case where an object to be placed is first placed on the Ch2 electric power transmitting unit 12 is flow in which the Ch1 electric power transmitting unit 11 and the Ch2 electric power transmitting unit 12 are exchanged with each other, and explanation will be omitted.

When the user gives an instruction to start processing to the electric power transmitter 1 through an operation button which is not illustrated, the CPU 62 reads various kinds of programs relating to electric power transmission from the ROM 64, develops the programs to the RAM 63 and starts processing of the programs.

The control unit 61 judges whether or not an object to be placed is placed on the Ch1 electric power transmitting unit 11 (step (hereinafter, abbreviated as "S") 1). In S1, it is detected whether or not a placement signal is received from the placement detecting unit 31, and, when the placement signal is received (S1: Yes), the processing proceeds to S2. On the other hand, when the placement signal is not received (S1: No), the processing returns to S1 again, and, it is judged whether an object to be placed is placed. That is, in S1, the electric power transmitter 1 waits until an object placed on the Ch1 electric power transmitting unit 11 is detected, and, when an object placed on the Ch1 electric power transmitting unit 11 is detected, the processing proceeds to S2.

The control unit 61 starts driving of the timer unit 65 (S2). In S2, the judging unit 66 outputs a drive instruction to drive the timer unit 65.

The control unit 61 judges whether or not communication with the Ch1 electric power transmitting unit 11 is established (S3). In S3, for the Ch1 electric power transmitting unit 11, it is judged whether or not a response signal (ACK) transmitted from the electric power receiving target 101 is received from the communication detecting unit 41, that is, whether or not communication for the electric power receiving target 101 is established, and, if communication is not established (S3: No), the processing proceeds to S21. On the other hand, when communication is established (S3: Yes), the processing proceeds to S4.

The control unit 61 starts electric power transmission (S4). In S4, in the control unit 61, the electric power transmission control unit 68 instructs the Ch1 electric power transmitting unit 11 to transmit electric power. The electric power transmission control unit 68 transmits a control signal giving an instruction to transmit electric power to the inverter unit S1. The inverter unit S1 supplies AC power to the Ch1 electric power transmitting unit 11. The Ch1 electric power transmitting unit 11 transmits electric power to the electric power receiving unit 111 of the electric power receiving target 101. Further, the control unit 61 controls the Ch1 display unit 21 to emit a light of blue color through processing of the display control unit 67. Display of blue light emission is display indicating that the control unit 61 judges that the placed object is the electric power receiving unit 111 of the electric power receiving target 101.

The control unit 61 judges whether or not the timer unit 65 is being driven (S5). In S5, it is judged whether or not the timer unit 65 is being driven, and, when the timer unit 65 is not being driven, the processing proceeds to S7 (S5: No). On the other hand, when the timer unit 65 is being driven (S5: Yes), the processing proceeds to S6.

The control unit 61 judges whether or not the predetermined time period T has elapsed since the timer unit 65 is driven (S6). In S6, when the predetermined time period T has elapsed (S6: Yes), driving of the timer unit 65 is stopped (S6Y), and the processing proceeds to S7.

The control unit 61 judges whether or not the Ch1 electric power transmitting unit 11 is transmitting electric power (S7). When the Ch1 electric power transmitting unit 11 is not transmitting electric power (S7: No), the processing of the flow is finished (S7N). That is, in S7N, when the predetermined time period T has elapsed since the Ch1 electric power transmitting unit 11 starts electric power transmission, and, then, electric power transmission of the Ch1 electric power transmitting unit 11 is finished, the processing is finished.

When the Ch1 electric power transmitting unit 11 is transmitting electric power (S7: Yes), the control unit 61 judges whether or not an object to be placed is placed on the Ch2 electric power transmitting unit 12 (S8). In S8, it is detected whether or not a placement signal is received from the placement detecting unit 32, and, when the placement signal is not received (S8: No), the processing returns to S5. On the other hand, when the placement signal is received (S8: Yes), the processing proceeds to S9. That is, in S8, during electric power transmission in the Ch1 electric power transmitting unit 11, processing is returned to S5 and repeated until an object placed on the Ch2 electric power transmitting unit 12 is detected. Then, when an object placed on the Ch2 electric power transmitting unit 12 is detected, the processing proceeds to S9.

The control unit 61 judges whether or not the timer unit 65 is being driven (S9). In S9, it is judged whether or not the timer unit 65 is being driven, and, when the timer unit 65 is not being driven (S9: No), the processing proceeds to S11. On the other hand, when the timer unit 65 is being driven (S9: Yes), the processing proceeds to S10.

The control unit 61 judges whether or not communication with the Ch2 electric power transmitting unit 12 is established (S10). In S10, for the Ch2 electric power transmitting unit 12, it is judged whether a response signal (ACK) is received from the communication detecting unit 42. When the Ch1 electric power transmitting unit 11 is being energized, and the response signal (ACK) is not received within the predetermined time period T although an object placed on the Ch2 electric power transmitting unit 12 is detected (S10: No), it is judged that the object placed on the Ch2 electric power transmitting unit is a portion of the electric power receiving target 101 which is the same as that on the Ch1 electric power transmitting unit, the portion not having the electric power receiving unit 111. In this case, processing of the flow is finished.

More specifically, after the placement detecting unit 31 detects a placed object, and the communication detecting unit 41 detects the electric power receiving unit 111 of the electric power receiving target 101 through the processing of the judging unit 66, if the placement detecting unit 32 detects the placed object and the communication detecting unit 42 does not detect the electric power receiving target 101 within a drive period T of the timer unit 65, the control unit 61 judges that, the object placed on the Ch1 electric power transmitting unit 11 is the electric power receiving unit 111 of the electric power receiving target 101, and, the object placed on the Ch2 electric power transmitting unit 12 is a portion not having the electric power receiving unit 111 of the electric power receiving target 101.

On the other hand, when the response signal (ACK) is received from the communication detecting unit 42 (S10: Yes), the control unit 61 controls the Ch2 electric power transmitting unit 12 to start electric power transmission. The control unit 61 controls the Ch2 display unit 22 to emit a light of blue color through the processing of the display control unit 67, and, processing of the flow is finished (S10Y).

In the case of No in S9, the control unit 61 judges whether or not communication with the Ch2 electric power transmitting unit 12 is established (S11). In S11, for the Ch2 electric power transmitting unit 12, it is judged whether the response signal (ACK) is received from the communication detecting unit 42, and, when the response signal (ACK) is not received (S11N), as illustrated in FIG. 8, it is judged that a foreign matter is placed on the Ch2 electric power transmitting unit 12. In that case, the control unit 61 controls the Ch2 display unit 22 to emit a light of red color through processing of the display control unit 67, and, processing of the flow is finished. Red light emission is display indicating that the control unit 61 judges that the placed object is a foreign matter (D in FIG. 8).

On the other hand, when the response signal (ACK) is received from the communication detecting unit 42 (S11Y), as illustrated in FIG. 9, the control unit 61 controls the Ch2 electric power transmitting unit 12 to start electric power transmission through processing of the electric power transmission control unit 68. Further, the control unit 61 controls the Ch2 display unit 22 to emit a light of blue color through processing of the display control unit 67, and, processing of the flow is finished. As a result, both the Ch1 electric power transmitting unit 11 and the Ch2 electric power transmitting unit 12 transmit electric power.

Figure 10:
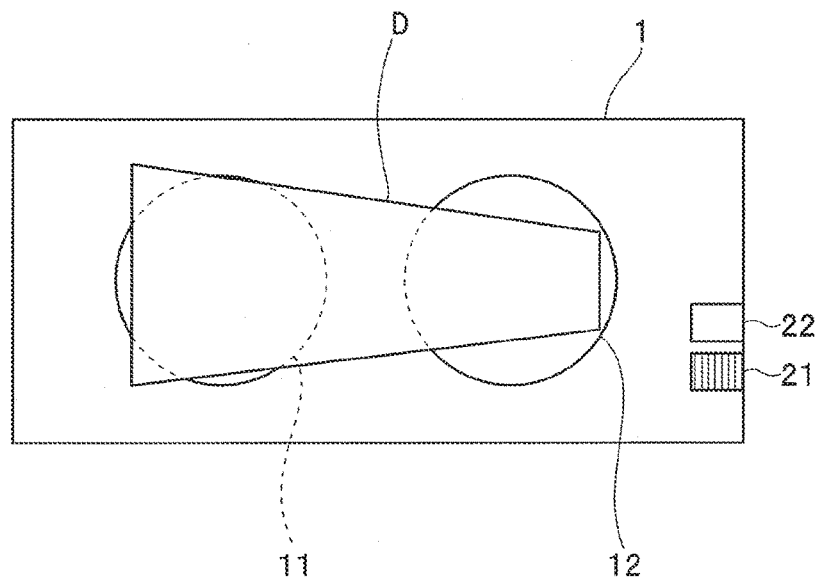
FIG. 10 is an explanatory diagram for explaining a state where a foreign matter is placed across two electric power transmitting units of the electric power transmitter according to the embodiment.
Figure 11:
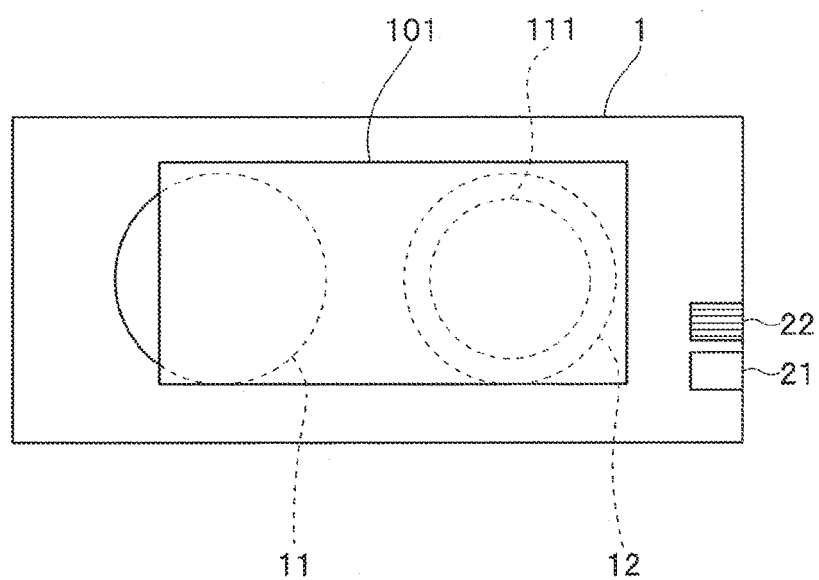
FIG. 11 is an explanatory diagram for explaining a state where the electric power receiving target is placed across the two electric power transmitting units of the electric power transmitter according to the embodiment.

FIG. 10 is an explanatory diagram for explaining a state where a foreign matter is placed across two electric power transmitting units of the electric power transmitter 1 according to the embodiment. FIG. 11 is an explanatory diagram for explaining a state where the electric power receiving target 101 is placed across the two electric power transmitting units of the electric power transmitter 1 according to the embodiment.

Next, as illustrated in FIG. 6, processing flow in the case where the communication detecting unit 41 detects that communication is not established in S3 will be described. In S3, a case where communication is not established includes, for example, a case where a portion not having the electric power receiving unit 111 of the electric power receiving target 101 is placed or a foreign matter is placed on the Ch1 electric power transmitting unit 11.

The control unit 61 judges whether or not the timer unit 65 is being driven (S21). In S21, when the timer unit 65 is not being driven, the processing proceeds to S23 (S21: No). On the other hand, when the timer unit 65 is being driven (S21: Yes), the processing proceeds to S22.

The control unit 61 judges whether or not the predetermined time period T has elapsed since the timer unit 65 is driven (S22). In S22, when the predetermined time period T has elapsed (S22: Yes), the control unit 61 stops driving of the timer unit 65, and controls the Ch1 display unit 21 to emit a light of red color through the processing of the display control unit 67, and the processing proceeds to S23 (S22Y). Here, although the placed object is detected on the Ch1 electric power transmitting unit 11, because communication is not established within the predetermined time period T and an object placed on the Ch2 electric power transmitting unit 12 cannot be detected, the control unit 61 judges that the placed object is a foreign matter.

The control unit 61 judges whether or not an object to be placed is placed on the Ch2 electric power transmitting unit 12 (S23). In S23, it is detected whether or not the placement signal is received from the placement detecting unit 32, and, when the placement signal is not received (S23: No), the processing returns to S21. On the other hand, when the placement signal is received from the placement detecting unit 32 (S23: Yes), the processing proceeds to S24. In S23, processing of returning to S21 is repeated until an object placed on the Ch2 electric power transmitting unit 12 is detected within the predetermined time period T after the object placed on the Ch1 electric power transmitting unit 11 is detected.

The control unit 61 judges whether or not the timer unit 65 is being driven (S24). In S24, when the timer unit 65 is not being driven (S24: No), the control unit 61 controls the Ch1 display unit to emit a light of red color when the Ch1 display unit does not emit a light of red color, through the processing of the display control unit 67 (S24N), and the processing proceeds to S26. On the other hand, when the timer unit 65 is being driven (S24: Yes), the processing proceeds to S25.

The control unit 61 judges whether or not communication with the Ch2 electric power transmitting unit 12 is established (S25). In S25, for the Ch2 electric power transmitting unit 12, it is judged whether the response signal (ACK) is received from the communication detecting unit 42, and, when the response signal (ACK) is not received (S25: No), as illustrated in FIG. 10, it can be judged that a common foreign matter D is placed on the Ch1 electric power transmitting unit 11 and the Ch2 electric power transmitting unit 12. Therefore, the control unit 61 controls the Ch1 display unit 21 so as to emit a light of red color and controls the Ch2 display unit 22 so as not to emit a light through the processing of the display control unit 67 (S25N), and processing of the flow is finished. Note that, while, in the present embodiment, only the Ch1 display unit 21 is controlled to emit a light of red color, light emission is not limited to this, and, it is also possible to perform control so that the Ch2 display unit 22 emits a light of red color to indicate that the placed object is a foreign matter, or only the Ch2 display unit 22 emits a light of red color.

On the other hand, when the response signal (ACK) is received from the communication detecting unit 42 (S25: Yes), the control unit 61 controls the Ch2 electric power transmitting unit 12 to start electric power transmission (S25Y). In S25Y, as illustrated in FIG. 11, the control unit 61 controls the Ch1 display unit 21 so as not to emit a light and controls the Ch2 display unit 22 to emit a light of blue color through the processing of the display control unit 67.

That is, when, through the processing of the judging unit 66, a placed object is detected by the second detecting unit K2 within a drive period of the timer unit 65, and the first detecting unit K1 does not detect the electric power receiving unit 111 of the electric power receiving target 101, and the second detecting unit K2 detects the electric power receiving unit 111 of the electric power receiving target 101, the control unit 61 judges that one of the common electric power receiving targets 101 is placed on the Ch1 electric power transmitting unit 11 and the Ch2 electric power transmitting unit 12.

Specifically, when, through the processing of the judging unit 66, after the placement detecting unit 31 detects the placed object, the communication detecting unit 41 does not detect the electric power receiving unit 111 of the electric power receiving target 101 within a drive period of the timer unit 65, the placement detecting unit 32 detects the placed object, and the communication detecting unit 42 detects the electric power receiving unit 111 of the electric power receiving target 101, the control unit 61 judges that the object placed on the Ch1 electric power transmitting unit 11 is a portion not having the electric power receiving unit 111 of the electric power receiving target 101, and the object placed on the Ch2 electric power transmitting unit 12 is the electric power receiving unit 111 of the electric power receiving target 101.

In S26, the control unit 61 judges whether or not communication with the Ch2 electric power transmitting unit 12 is established (S26). In S26, for the Ch2 electric power transmitting unit 12, it is judged whether the response signal (ACK) is received from the communication detecting unit 42, and, when the response signal (ACK) is not received (S26: No), the control unit 61 controls the Ch2 display unit 22 to emit a light of red color through the processing of the display control unit 67 (S26N), and processing of the flow is finished. By this means, when, after the predetermined time period T has elapsed, an object placed on the Ch2 electric power transmitting unit 12 is detected, and communication is not established, the Ch2 display unit 22 displays that the control unit 61 judges that the placed object is a foreign matter.

On the other hand, when the response signal (ACK) is received from the communication detecting unit 42 (S26Y), the control unit 61 controls the Ch2 electric power transmitting unit 12 to start electric power transmission, and controls the Ch2 display unit 22 to emit a light of blue color, and processing of the flow is finished. By this means, the Ch2 display unit displays that the control unit 61 judges that the placed object is the electric power receiving unit 111.

Processing from S1 to S26N configures processing of the judging unit 66. FIG. 12 is a table for explaining display content of the display unit of the electric power transmitter 1 according to the embodiment.

As illustrated in FIG. 12, display content of the display units is determined through the processing of the judging unit 66. For example, when, in the Ch1 electric power transmitting unit 11, the placed object is detected, and communication is established, and when, in the Ch2 electric power transmitting unit 12, the placed object is detected and communication is not established within the predetermined time period T, the Ch1 display unit 21 displays that the placed object is judged as the electric power receiving unit ("electric power receiving unit" in FIG. 12, that is, blue light emission display), and the Ch2 display unit 22 displays that the control unit 61 judges that the placed object is a portion other than the electric power receiving unit, of the common electric power receiving target ("not displayed" in FIG. 12, that is, no light emission) (A1 in FIG. 12).

Further, for example, when, in the Ch1 electric power transmitting unit 11, the placed object is detected, and communication is not established, and, when, in the Ch2 electric power transmitting unit 12, the placed object is detected and communication is established within the predetermined time period T, the Ch1 display unit 21 displays that the control unit 61 judges that the placed object is a portion other than the electric power receiving unit, of the electric power receiving target ("not displayed" in FIG. 12, that is, no light emission), and the Ch2 display unit 22 displays that the control unit 61 judges that the placed object is the electric power receiving unit of the common electric power receiving target ("electric power receiving unit" in FIG. 12, that is, blue light emission display) (A2 in FIG. 12).

According to the embodiment, it is possible to provide an electric power transmitter, an electric power transmission method, and a semiconductor device in which, even when the electric power receiving target 101 is placed across the plurality of electric power transmitting units, an electric power transmitting unit on which a portion not having the electric power receiving unit 111 is placed does not detect the electric power receiving target 101 as a foreign matter, and which can suppress wasteful power consumption, and which can eliminate necessity for the user to perform extra work of placing the electric power receiving target 101 again.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. An electric power transmitter, comprising:
   a first detecting unit configured to detect a first placed object on a first electric power transmitting unit;
   a second detecting unit configured to detect a second placed object on a second electric power transmitting unit;
   a timer unit configured to start driving when the first placed object on the first electric power transmitting unit is detected; and
   a judging unit configured to, when the second placed object on the second electric power transmitting unit is detected within a predetermined time period from the driving of the timer unit, judge that the first placed object and the second placed object are one common placed object.

2. The electric power transmitter according to claim 1, wherein, when the first and the second placed objects are detected within the predetermined time period, and one of the detecting units detects an electric power receiving unit of an electric power receiving target, and another of the detecting units does not detect the electric power receiving unit, the judging unit makes the one of the electric power transmitting units start electric power transmission and does not make the other of the electric power transmitting units perform electric power transmission.

3. The electric power transmitter according to claim 1, further comprising:
   a first display unit and a second display unit configured to display an electric power transmission state of the first electric power transmitting unit and an electric power transmission state of the second electric power transmitting unit, respectively.

4. The electric power transmitter according to claim 3, wherein, when the first and the second placed objects are foreign matters different from electric power receiving target, the first and the second display units display that the first placed object is a foreign matter and that the second placed object is a foreign matter, respectively.

5. The electric power transmitter according to claim 2, further comprising:
   first and second display units configured to display an electric power transmission state of the first electric power transmitting unit and an electric power transmission state of the second electric power transmitting unit, respectively, and, when the first and the second placed objects are foreign matters, display that the first placed object is a foreign matter and that the second placed object is a foreign matter, respectively,
   wherein one of the display units displays an electric power transmission state, and another of the display units does not perform display.

6. The electric power transmitter according to claim 1,
wherein the first detecting unit comprises a first placement detecting unit configured to detect that the first placed object is placed on the first electric power transmitting unit, and
the second detecting unit comprises a second placement detecting unit configured to detect that the second placed object is placed on the second electric power transmitting unit.

7. The electric power transmitter according to claim 6,
wherein the first detecting unit comprises a first communication detecting unit configured to detect that the first placed object is an electric power receiving unit, and
the second detecting unit comprises a second communication detecting unit configured to detect that the second placed object is an electric power receiving unit.

8. The electric power transmitter according to claim 7,
wherein the judging unit judges:
a first judgement result judging that the first or the second placed object is an electric power receiving unit of an electric power receiving target;
a second judgement result judging that the first or the second placed object is a portion, not having the electric power receiving unit, of the electric power receiving target; and
a third judgement result judging that the first or the second placed object is a foreign matter.

9. The electric power transmitter according to claim 8,
wherein, when, after the first placement detecting unit detects the first placed object, and the first communication detecting unit detects the electric power receiving unit, the second placement detecting unit detects the second placed object and the second communication detecting unit does not detect the electric power receiving unit within a drive period of the timer unit,
the judging unit judges the first judgement result for the first electric power transmitting unit, and judges the second judgement result for the second electric power transmitting unit.

10. The electric power transmitter according to claim 8,
wherein, when, after the first communication detecting unit does not detect the electric power receiving unit, and the first placement detecting unit detects the first placed object, the second placement detecting unit detects the second placed object and the second communication detecting unit detects the electric power receiving unit within a drive period of the timer unit,
the judging unit judges the second judgement result for the first electric power transmitting unit, and judges the first judgement result for the second electric power transmitting unit.

11. The electric power transmitter according to claim 8,
wherein, when, after the first communication detecting unit does not detect the electric power receiving unit, and the first placement detecting unit detects the first placed object, the second placement detecting unit detects the second placed object and the second communication detecting unit does not detect the electric power receiving unit within a drive period of the timer unit,
the judging unit judges the third judgement result for the first electric power transmitting unit, and judges the second judgement result for the second electric power transmitting unit.

12. The electric power transmitter according to claim 8,
wherein, when, after the first placement detecting unit detects the first placed object, and the first communication detecting unit detects the electric power receiving unit, the second placement detecting unit detects the second placed object and the second communication detecting unit does not detect the electric power receiving unit after a drive period of the timer unit elapses,
the judging unit judges the first judgement result for the first electric power transmitting unit, and judges the third judgement result for the second electric power transmitting unit.

13. The electric power transmitter according to claim 8,
wherein, when, after the first communication detecting unit does not detect the electric power receiving unit and the first placement detecting unit detects the first placed object, the second placement detecting unit detects the second placed object and the second communication detecting unit detects the electric power receiving unit after a drive period of the timer unit elapses,
the judging unit judges the third judgement result for the first electric power transmitting unit, and judges the first judgement result for the second electric power transmitting unit.

14. The electric power transmitter according to claim 8,
wherein, when, after the first communication detecting unit does not detect the electric power receiving unit, and the first placement detecting unit detects the first placed object, the second placement detecting unit detects the second placed object and the second communication detecting unit does not detect the electric power receiving unit after a drive period of the timer unit elapses,
the judging unit judges the third judgement result for the first electric power transmitting unit, and judges the third judgement result for the second electric power transmitting unit.

15. The electric power transmitter according to claim 4,
wherein each of the first display unit and the second display unit comprises a light emitting device,
the first and the second display units respectively emit a light of a first color when the first and the second electric power transmitting units are in an electric power transmission state, and
the first and the second display units respectively emit a light of a second color different from the first color when a foreign matter is placed on the first or the second electric power transmitting unit.

16. The electric power transmitter according to claim 1,
wherein each of the first electric power transmitting unit and the second electric power transmitting unit comprises an electric power transmitting coil configured to transmit electric power.

17. The electric power transmitter according to claim 7,
wherein the first communication detecting unit can superimpose a signal on AC power to be supplied to the first electric power transmitting unit and transmit the signal to the electric power receiving target via the first electric power transmitting unit, and
the second communication detecting unit can superimpose a signal on AC power to be supplied to the second electric power transmitting unit and transmit the signal to the electric power receiving target via the second electric power transmitting unit.

18. An electric power transmission method, comprising:
  detecting a first placed object by a first detecting unit configured to detect the first placed object on a first electric power transmitting unit;
  driving a timer unit from a time point at which the first detecting unit detects the first placed object;
  when a second placed object is detected by a second detecting unit configured to detect the second placed object on a second electric power transmitting unit within a predetermined time period from driving of the timer unit, judging that the first placed object and the second placed object are one common placed object; and
  displaying a judgement result on a display unit.

19. The electric power transmission method according to claim 18,
  wherein, when one of the detecting units detects an electric power receiving unit of an electric power receiving target, and another of the detecting units does not detect the electric power receiving unit, the one of the electric power transmitting units starts electric power transmission, and the other of the electric power transmitting units does not perform electric power transmission.

20. A semiconductor device, comprising:
  a first detecting unit configured to detect a first placed object on a first electric power transmitting unit;
  a second detecting unit configured to detect a second placed object on a second electric power transmitting unit;
  a timer unit configured to start driving when the first placed object on the first electric power transmitting unit is detected; and
  a judging unit configured to, when the second placed object is detected on the second electric power transmitting unit within a predetermined time period from driving of the timer unit, judge that the first placed object and the second placed object are one common placed object.

* * * * *